Dec. 23, 1952  J. A. AMORI  2,622,719
FRUIT HANDLING APPARATUS
Filed June 5, 1948  5 Sheets-Sheet 1

INVENTOR.
Joseph A. Amori
By Robt. D. Pearson
ATTORNEY.

Dec. 23, 1952  J. A. AMORI  2,622,719
FRUIT HANDLING APPARATUS
Filed June 5, 1948  5 Sheets-Sheet 2
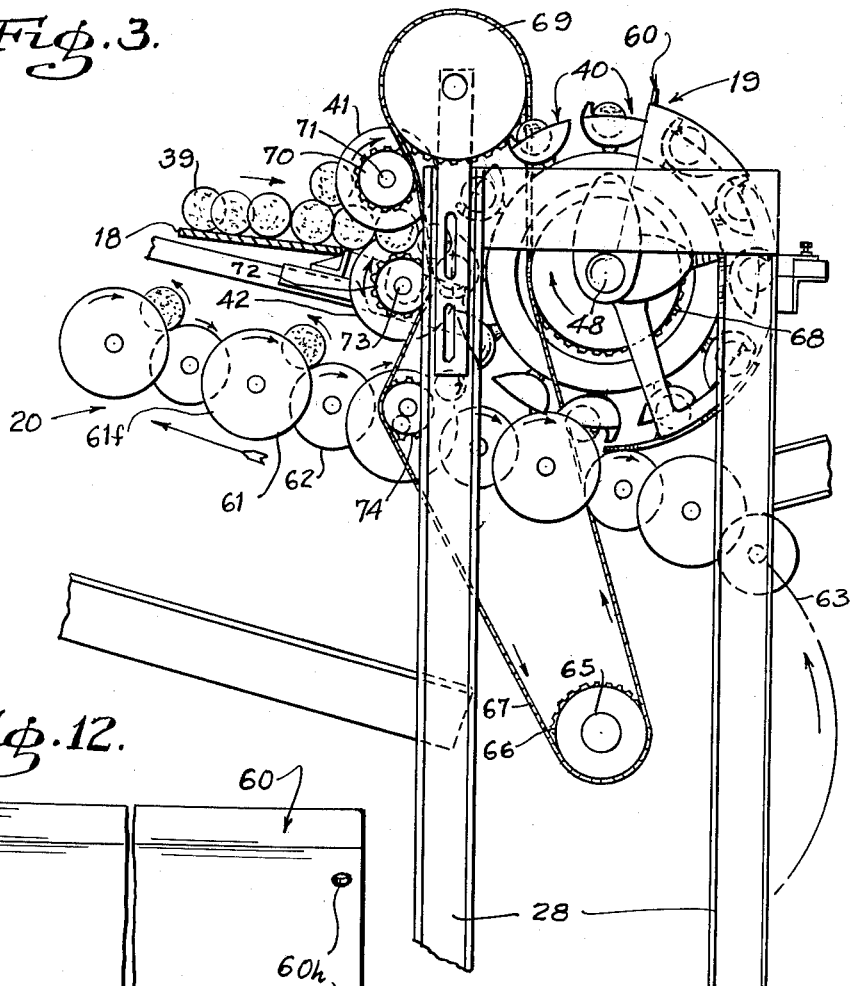
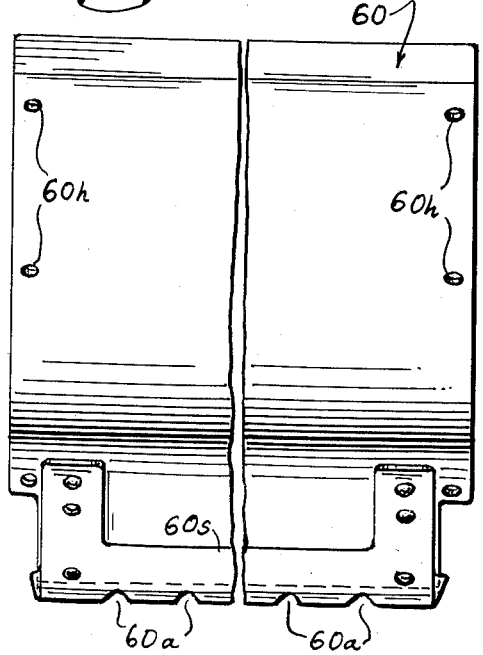
INVENTOR.
Joseph A. Amori
BY Robt. W. Pearson
ATTORNEY.

Dec. 23, 1952  J. A. AMORI  2,622,719
FRUIT HANDLING APPARATUS
Filed June 5, 1948  5 Sheets-Sheet 3
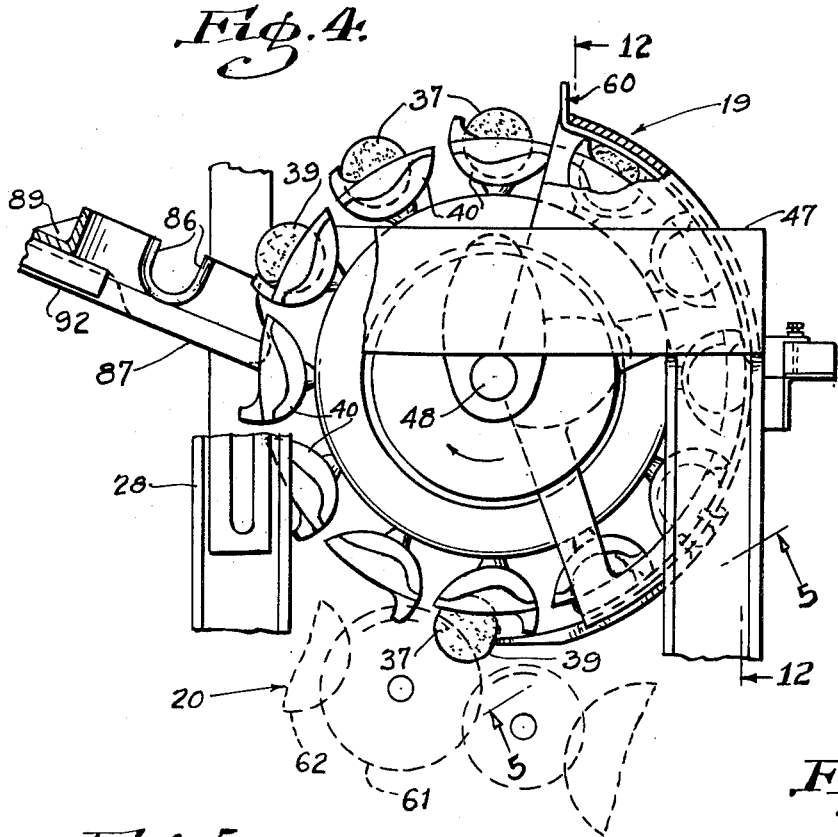
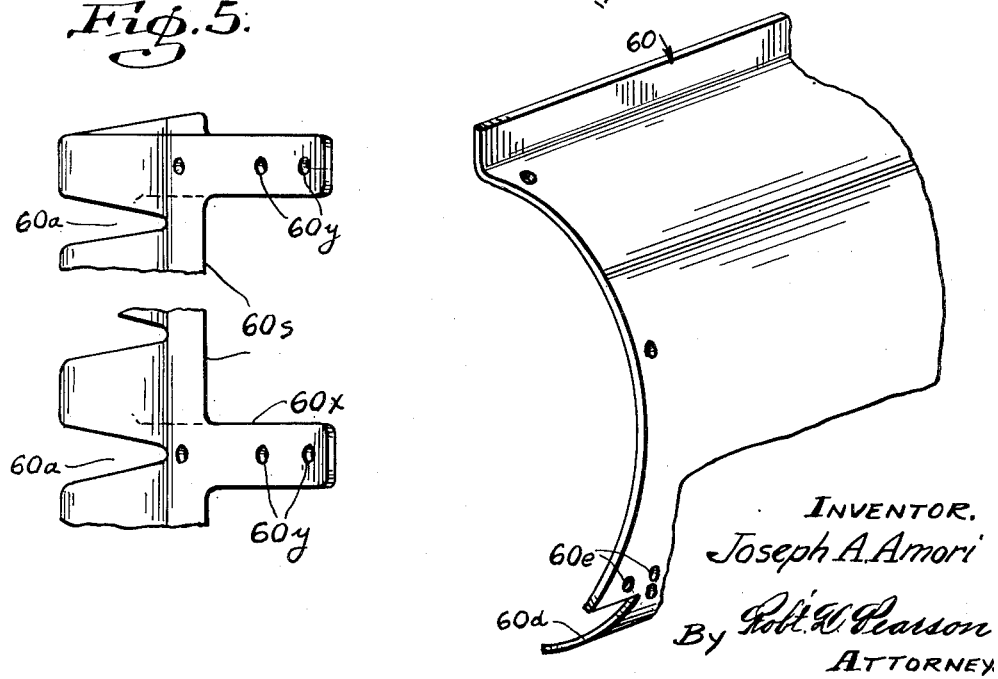
INVENTOR.
Joseph A. Amori
By Robt. W. Pearson
ATTORNEY Dec. 23, 1952 J. A. AMORI 2,622,719
FRUIT HANDLING APPARATUS
Filed June 5, 1948 5 Sheets-Sheet 4
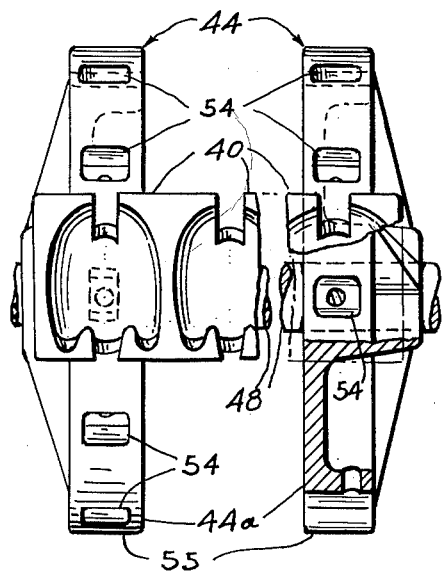
Fig. 8.
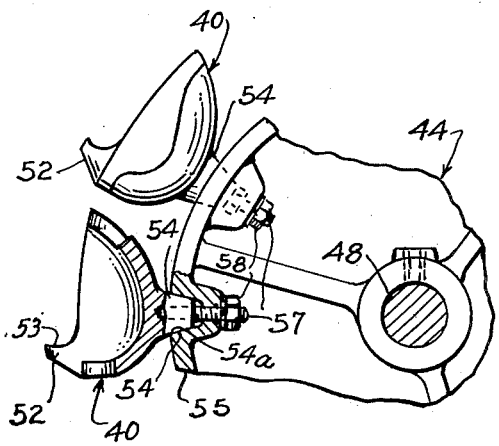
Fig. 7.
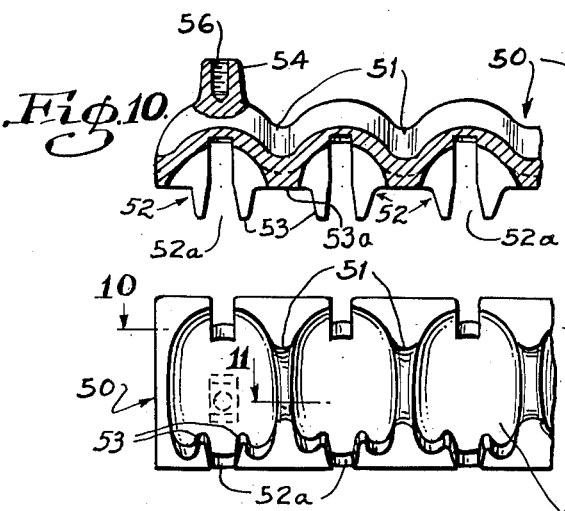
Fig. 10.
Fig. 9.
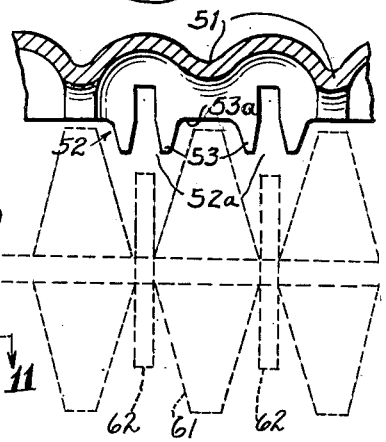
Fig. 11.
INVENTOR,
Joseph A. Amori
By Robt. W. Pearson
ATTORNEY.

Dec. 23, 1952 J. A. AMORI 2,622,719
FRUIT HANDLING APPARATUS
Filed June 5, 1948 5 Sheets-Sheet 5

INVENTOR.
Joseph A. Amori
BY Robt. W. Pearson
ATTORNEY.

Patented Dec. 23, 1952

2,622,719

UNITED STATES PATENT OFFICE 2,622,719

FRUIT HANDLING APPARATUS

Joseph A. Amori, San Jose, Calif.

Application June 5, 1948, Serial No. 31,239

5 Claims. (Cl. 198—103)

This invention relates to a quantity fruit handling apparatus to deliver fruits singly to various machines, such as slicers and pitters.

More specifically speaking, the invention pertains to an apparatus equipped with a considerable number of conveyors for simultaneously advancing, mechanically, one or more rows or processions of fruits toward an equal number of mechanically driven devices, thus to efficiently produce, for example, sliced and pitted fruits in quantities and at a lowered operating cost.

The aforesaid pitting devices may embody certain features described and claimed in my copending application Serial No. 691,708, filed August 20, 1946, for patent on Fruit Pitting Machine, and now abandoned.

Among the objects of the present invention are: to provide, in an apparatus for handling large quantities of fruit, means to rapidly and mechanically feed a predetermined amount of fruit to each of a plurality of, for example, slicing and pitting machines, and to coordinate in an improved manner the simultaneously, mechanically driven parts of the machine.

A more specific, important object of the invention is to provide an assembly of improved fruit handling cups together with improved, rotatable mounting means therefor.

Other objects, advantages and features of invention will hereinafter appear.

Referring to the accompanying drawings, which illustrate a preferred embodiment of the invention, Fig. 1 is a diagrammatic side elevation of the apparatus, showing the general arrangement of the fruit conveying and fruit delivering means.

Fig. 3 is a diagrammatic elevation showing a series of receiving rollers mounted upon a conveyor, and including a rotatable member carrying a plurality of cups to receive individually and advance the fruits.

Fig. 4 is a more detailed view of the same rotatable member that receives the fruits and advances them.

Fig. 5 is an enlarged fragmentary section on line 5—5 of Fig. 4.

Fig 6 is an enlarged perspective detail of the guide plate shown in Fig 4.

Fig. 7 is an enlarged fragment of the wheel shown in Fig. 4, showing in detail two of the fruit receiving cups.

Fig. 8 is a partly elevational and partly sectional view of the rotatable member shown in Fig. 7, with the cups removed.

Fig. 9 is a fragmental side elevation of an end portion of a series of the fruit-receiving cups.

Figs. 10 and 11 are, respectively, sections on lines 10—10 and 11—11 of Fig. 9.

Fig. 12 is a side elevation, combining in one view the structures shown fragmentally in Figs. 5 and 6, a central fragment being broken out in order to contract the view.

Figure 13:
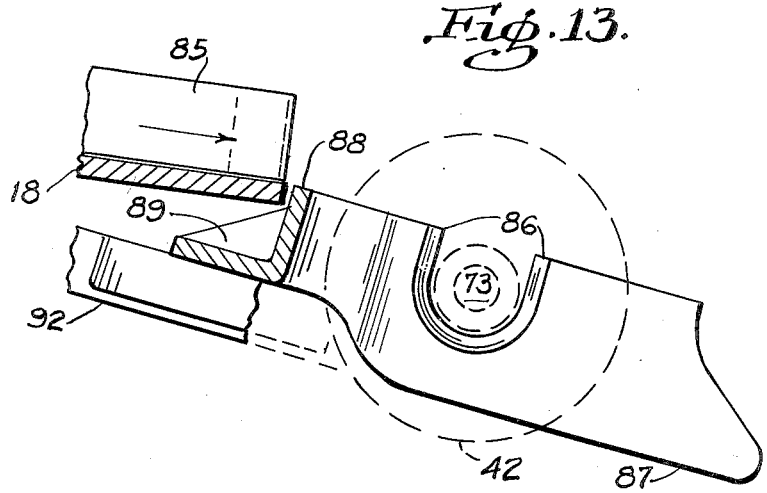
Figure 14:
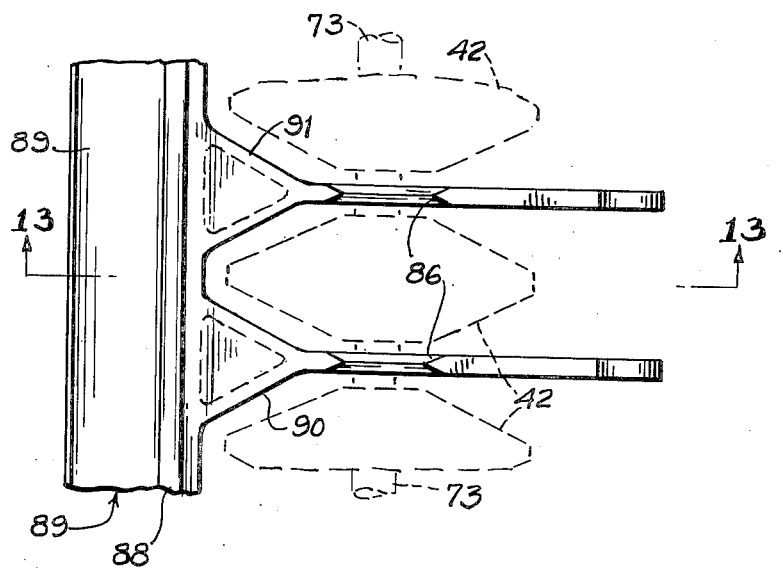

Fig. 13 is an enlarged fragmental section taken on line 13—13 on Fig. 14.

Fig. 14 is a fragmental plan view of the structure shown in Fig. 13.

Figure 1:
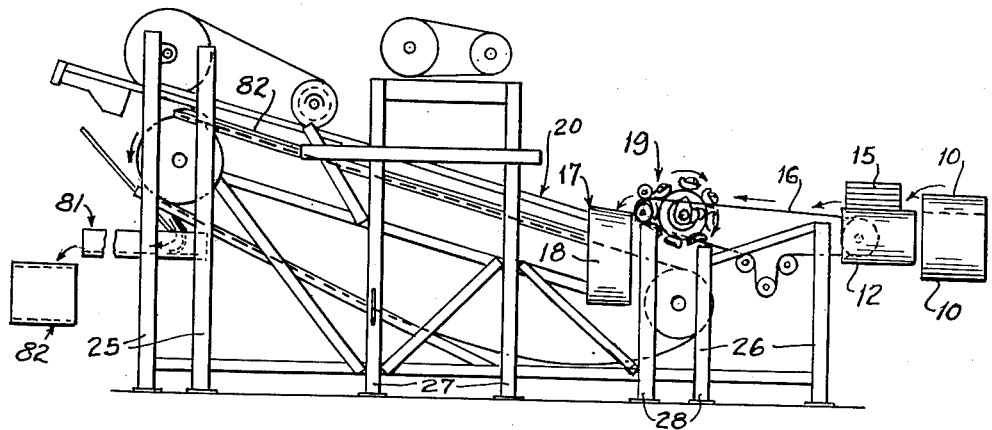
Figure 2:
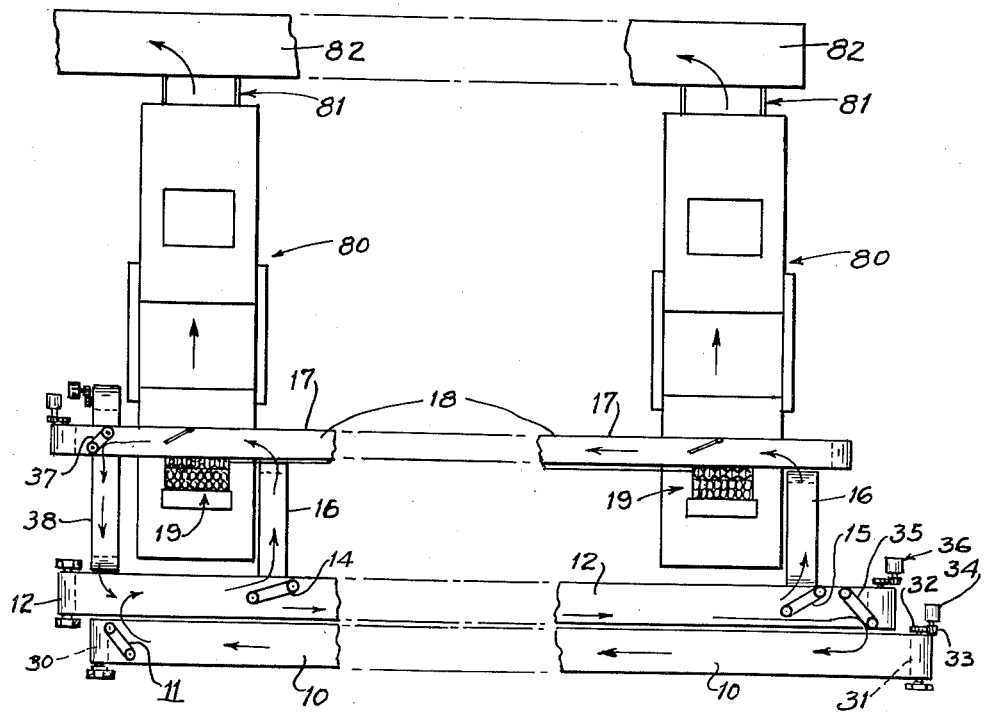
Fig. 2 is a diagrammatic plan view showing how the fruit is mechanically fed to a plurality of mechanisms which operate upon it.

Referring in detail to the drawings, and first more particularly to the general arrangement of the parts of the mechanism as shown in Figs. 1 and 2, the main parts shown in said views are the somewhat inclined initial endless conveyor 10, from the higher delivery end of the upper run of which the fruit is shunted, by baffle belt 11, onto one end portion of the upper run of a reversely traveling, nearly horizontal endless conveyor 12. From said conveyor 12 a series of shunt belts, two designated 14 and 15 being shown, shift advancing fruit laterally onto a succession of shorter right angularly directed conveyors 16, whereby the fruit is conveyed to the upper run 17 of an endless conveyor 18. Said upper run 17 is somewhat inclined as to its length, with its delivery end lowest. This belt also has its upper run 17 transversely inclined (see Fig. 1), so as to roll the fruit toward the series of cup-carrying assemblies 19 located at spaced apart points along its length. Said assemblies 19 deliver the individual fruits to separate pockets in a conveying mechanism 20 (see Figs. 2 and 4) whereby the fruits are conveyed to mechanism that operates upon them individually, for example, the pitting mechanism described and claimed in my aforesaid application for United States Letters Patent.

The foregoing brief outline of the main mechanical features of the illustrated embodiment of the invention will make it possible more readily to understand the detailed description which follows.

The preferred supporting means for the various mechanisms of the apparatus may comprise end standards or frames 25 and 26, a central standard or frame 27, and a pair of posts 28 located between said standards 26 and 27, these standards being appropriately braced into one general assembly, as shown in Fig. 1.

Returning to the conveyor structures at the fruit-receiving part of the apparatus, the aforesaid initial endless conveyor 10 is shown supported at one end by an idler drum 30 and at its opposite end by a driven drum 31, the latter drum carrying a gear 32 with which meshes a pinion gear 33 driven by a motor 34. Fig. 2, being of a diagrammatic character does not show mounting means for the parts just mentioned, or for the parts which will next be mentioned, but the construction of suitable supports for endless conveyors of this kind is well understood in the art to which this invention pertains. The fruit-conveying belt 10, as well as the other conveying belts presently to be described, are provided with conventional side rails to prevent the fruits from lateral displacement, said rails having passages through them where required.

In addition to the already mentioned endless shunt belts 11, 14 and 15, an endless shunt belt 35 is provided, located superjacent to the delivery end portion of the conveyor 12, the latter shunt belt deflecting back onto the initial conveyor 10 any fruits that may get past the shunt belts 14 and 15. All these shunt belts are diagrammatically shown, it being understood that they are each mounted upon a stationary support carried by the main supporting means.

The pick-up end portion of the shunt belt 14 is located at about the midwidth of the upper run of the conveyor 12 so as to deflect onto the first of the shorter conveyors 16 only a part of the fruit being advanced by said conveyor 12, it being understood that, in the broken out part of Fig. 2, additional shunt belts will be stationed together with short conveyors onto which they deflect part of the advancing fruit, until near the delivery end of the conveyor 12 the shunt belt 15, which extends nearly all the way across the conveyor 12, will shunt all or nearly all of the passing fruit onto the final short conveyor 16. A driving means 36 is provided for conveyor 12, like the driving means already described which drives the conveyor 10. Also a like driving means 16 is provided for endless conveyor 16.

Some fruit may reach the discharge end of the conveyor 18 without having been delivered to any of the cup-carrying assemblies 19. Such fruit is taken care of by a shunt belt 37 which directs the fruit onto the upper run of an endless cross belt 38, positioned to deliver such fruit onto the receiving end of the aforesaid conveyor 12. Said conveyor 38 is furnished with driving means 38a.

Fig. 3 is the view which illustrates most clearly the delivery of the fruits 39 from one of the shorter belts 16 to one of the aforesaid assemblies 19 of cooperating parts whereby the fruits are individually deposited into the pockets of the aforesaid conveyor 20. In this view a part of said conveyor 20 is shown in section where it comes opposite to an upper horizontal row 41 of anti-clogging rollers and a lower horizontal row 42 of feeding rollers, both rows of rollers being comprised of double conical rollers, as is indicated for the rollers of row 42 in the dotted outline showing of Fig. 14. Said rows of rollers cooperate to feed the fruits singly to the cups 40 of the cup-carrying assembly 19 which includes the drum-like rotatable frame 44, mounted to rotate in a vertical plane, upon supporting means 26 and 28 already mentioned. Said rotatable frame 44 is concentrically secured to a driven shaft 48.

Said fruit receiving cups 40 are arranged in horizontal rows in the form of bars 50 in which adjacent cups are united to each other by webs 51. Each cup is furnished in one side portion of its outwardly directed mouth 52 with a projecting lip portion 53 which assumes an underlying relation to the fruits fed to it at the rising side of the rotating frame 44, preventing the fruits from dropping downwardly out of the ascending cup.

Each of said cup-carrying bars 50 has at the bottom of each end cup a projection 54 which fits into a recess 54a in the peripheral wall or felloe of the wheel-like structure 44a at each end of the rotatable frame 44. Said projection is provided in its end with an axial bore 56 into which is screwed a securing bolt 57 having screwed onto it a lock nut 58. In this manner a properly spaced apart, circumferentially extending series of horizontal cup-carrying bars is secured peripherally to the circular frame 44.

At the side of said frame 44 opposite to that to which the fruit is fed, an arcuate guard plate 60 is mounted with its concave face in a contacting relation to the descending fruits to keep them from falling out of the cups 40 until they reach the lower side of the rotating member 44. When the fruits reach that point, said plate 60 delivers them singly (as to each circumferential row of cups) to the already mentioned roller-carrying conveyor 20.

Said roller-carrying conveyor 20 need not be described in detail and is not separately claimed, for it is described and claimed in my aforesaid application for patent. It comprises a series of large rollers 61, said rollers being double conical in form similar to rollers 42, as indicated in dotted outline in Fig. 11, alternating with smaller cylindrical ones 62 all mounted upon an endless belt 63 and all mechanically rotated in a direction which causes their fruit-engaging sides to move oppositely to the direction in which the fruit is being advanced. These rollers are so constructed and arranged as to provide fruit receiving pockets between them, and the conveyor 20 and rotatable cup-carrying frame 44 are driven in a timed relation to each other so that as the upper run of said conveyor advances an individual fruit is deposited between each large roller 61 and the smaller roller 62 which trails it. The double conical peripheral edges of rollers 61 are greater diameter than the smaller cylindrical rollers 62, and thus the lower edge portion of the said guard plate 60 is provided with a detachable shoe 60s (Fig. 5) having slots 60a in its outer edge which afford clearances for said peripheral edges 61f of the advancing rollers 61. The spaces 53a between the lip projections 52 of adjacent cups in a row provide clearance for the edges 61f of rollers 61, as indicated in Fig. 11. The aforesaid guard plate 60 (see Figs. 6 and 12) is provided with marginal bolt holes 60h used in securing said plate to the machine. Below said bolt holes this plate has a narrowed downward extension 60d, also arcuate, and having bolt apertures 60e for bolting to it the arms 60x of the aforesaid shoe 60s.

Describing next certain connections, in Fig. 3 is shown a drive shaft 65 having fixed to it a sprocket wheel 66 which drives a sprocket chain 67 in the direction indicated by the arrows. The ascending run of this chain bears against a relatively large sprocket wheel 68 carried by the aforesaid shaft 48 of the rotatable cup-carrying frame, so that said frame is rotated in a clockwise direction as viewed in Figs. 3 and 4. The upper portion of said sprocket chain passes over a large idle sprocket wheel 69, whence the descending run of said sprocket chain engages a sprocket wheel 70 fixed to a shaft 71 that carries the already mentioned row of anticlogging rollers 41, said descending run next engaging a sprocket wheel 72 fixed to the shaft 73 of the already mentioned row of feed rollers 42. Farther down this run passes back of an idle sprocket wheel 74 provided to maintain the belt at proper tension and in proper engagement with the aforesaid sprocket wheels 70 and 72.

In Fig. 2 is indicated, in a diagrammatical manner, a series of fruit slicing units 80, and at the delivery end of said units a pit shaker 81 which removes the pits from the sliced fruit. Also a conveyor 82 is indicated in this view, and also in Fig. 1, this conveyor delivering, for example, to a canning mechanism, not shown.

In order to insure a dependable delivery of individual fruits from the conveying belt 18 to the individual passages between the row of anticlogging rollers 41 and row of feed rollers 42 subjacent to them, it is necessary, not only to incline the belt 18 transversely when it passes said rollers in a direction in which facilitates the feeding in of the fruit, but also to provide mechanical assistance to guide the individual fruits to this part of the mechanism.

The already mentioned shaft 73, which carries the row of feed rollers 42, is cleared at intervals along its length by notches 86 in the upper edges of spacer bars or plates 87, said bars being inclined as shown in Fig. 3 and being cast integral with or otherwise united to the upstanding flange 88 of an angle bar 89 which extends across the upper ends of said bars 87. Each of said bars 87 has a laterally expanded upper end portion 90, shown in Fig. 14 as triangularly shaped, thus providing triangular parts aiding in guiding the fruits into the spaces between adjacent feed rollers 42. Said angle iron members 89 are shown supported upon a frame member 92. The belt 18 is shown but slightly inclined where it passes the cup-carrying assembly, but it may be more steeply inclined in this region if necessary, to cause the fruits to roll more rapidly toward the means which guides them to the cup assembly.

It will be noted that, owing to the doubly conical shape of the feed rollers 42 a triangular space results between adjacent rollers and the bar 89. Each of said spaces is occupied by an aforesaid expanded, triangular bar portion 90 onto which the fruits roll, thence to pass between the space between the two adjacent rollers. The fruit, after passing over the expanded end portion 90 of bars 87 and over the rollers 42, is supported for pickup by the cups by the inner ends of bars 87. The slots 52a in the cup lips 52 and the slots 52b in the rear walls of the cups enable the cups to clear the ends of bars 87.

In Fig. 4 the feed rollers 42 and anti-clogging rollers 41 (see Fig. 3) are omitted so as to show the member 87 more clearly, but in Figs. 13 and 14 said rollers are outlined in broken lines.

In the foregoing description the course of the advancing fruit has been traced from where it is fed to the initial conveyor 10 to its delivery from the cup-carrying mechanism 19 onto the roller-carrying conveyor 20, which is the last link in the chain of mechanical elements to which the present application pertains. Therefore, additional description of the operation is deemed to be unnecessary.

I claim:

1. In a machine of the kind described, supporting means, a circular frame mounted thereon to rotate in a vertical plane, an assembly of cups carried peripherally by said frame in circumferential and longitudinal rows, fruit feeding means stationed adjacent to the ascending side of said frame as it rotates to feed fruits simultaneously to each ascending horizontal row of cups, a conveyor mounted below said frame and carrying a succession of roller members of relatively large diameter alternating with roller members of smaller diameter arranged to form pockets to receive individual fruits discharged from said cups at the lower side of said frame, the adjacent cups in each longitudinal row being sufficiently spaced apart to provide clearance for the advance there past of said larger roller members.

2. The subject matter of claim 1, and said smaller members being cylindrical and said larger members being in the form of double cones with their apices disposed together, thus providing end flanges positioned to prevent lateral displacement of fruits in the aforesaid pockets, and means to cause said members to rotate in a direction wherein their fruit engaging sides move in the direction opposite to that in which said conveyor is advancing the fruits.

3. In a machine of the kind described, supporting means, a circular frame rotatably mounted on said supporting means, said frame comprising two axially alined spaced apart wheel-like members having a common axle shaft to which they are both in a secured relation for being simultaneously rotated, rows of fruit conveying cups arranged in bar formations, said wheel-like members having felloes or peripheral wall portions, means to attach the end portions of said bars to said felloes, means including a channeled feed roller member to feed fruits individually into said cups at the ascending side of said rotatable frame and a conveyor stationed below said frame having pockets to receive the individual fruits as they fall from said cups.

4. In a machine of the kind described, supporting means, a plurality of axially alined circular frames mounted thereon to rotate about a horizontal axis, an assembly of fruit conveying cups mounted upon the periphery of each of said frame, means to rotate said frames simultaneously to cause said cups to ascend at one side of each of them and to descend at their opposite sides, a fruit feeding belt common to all of said assemblies of cups, said belt extending along the side of all of said assemblies where the fruits ascend, said belt being transversely inclined with its lower side positioned to deliver the fruits it is conveying to the ascending cups, means positioned between said belt and assembly of cups, to feed individual fruits to individual cups, conveyor means subjacent to said assemblies of cups and the circular frames which carry them, said conveyor means having pockets to receive individually fruits gravitating from said cups, and timed means to simultaneously rotate said circular frames and operate said conveyor means to position said pockets so as to receive the fruits as they gravitate from said cups.

5. In a machine of the kind described, supporting means, a circular frame mounted on said supporting means to rotate in a vertical plane, an assembly of cups carried peripherally by said frame in circular rows, a fruit feeding endless belt stationed with an upper run extending horizontally alongside of the ascending side of said rotatable frame, said belt being transversely inclined in a direction to deliver the fruits to said cups, a row of doubly conical feed rollers stationed between said belt and assembly of cups, a substantially horizontal shaft mounted upon the aforesaid supporting means and affording a common axial mounting means for the feed rollers of said row, bearing bars for said shaft alternating with said feed rollers and extending downwardly from said belt with their upper ends laterally expanded and positioned for the fruits to roll onto them from said belt and thence into the spaces between said adjacent feed rollers.

JOSEPH A. AMORI.

REFERENCES CITED

The following references are of record in the file of this patent:

UNITED STATES PATENTS

| Number | Name | Date |
|---|---|---|
| 334,274 | Norton | Jan. 12, 1886 |
| 1,078,719 | Cleveland | Nov. 18, 1913 |
| 1,687,685 | Olinger | Oct. 16, 1928 |
| 1,963,036 | Trolley | June 12, 1934 |
| 2,208,474 | Carroll | July 16, 1940 |
| 2,283,615 | Skinner et al. | May 19, 1942 |
| 2,303,755 | Newton | Dec. 1, 1942 |
| 2,364,163 | Pearson | Dec. 5, 1944 |
| 2,428,370 | Kelly | Oct. 7, 1947 |